Oct. 30, 1951     I. W. COX ET AL     2,573,094

ELECTRIC WELDING SYSTEM

Filed March 9, 1946

Inventors
Irvin W. Cox
Jerome B. Welch
By Frank H. Hubbard
Attorney

UNITED STATES PATENT OFFICE 2,573,094

ELECTRIC WELDING SYSTEM

Irvin W. Cox, West Allis, and Jerome B. Welch, Milwaukee, Wis., assignors to Cutler-Hammer, Inc., Milwaukee, Wis., a corporation of Delaware Application March 9, 1946, Serial No. 653,269

7 Claims. (Cl. 219—4)

This invention relates to the control of current impulses and while not limited thereto is particularly adapted to the control of supply of welding current to a workpiece which is to be welded.

An object of the invention is to provide means for supplying automatically from a welding transformer a single unidirectional welding current impulse, in response to energization of a pilot circuit.

Another object is to provide means requiring deenergization of said pilot circuit following supply of a current impulse in response to energization of said circuit.

Another object is to provide in a system of the aforementioned type means for demagnetizing of the welding transformer after the impulse has ceased.

Another object is to provide means to prevent sparking at the welding electrodes resulting from initiation of the flow of secondary transformer current, at the instant of contact or separation of the welding electrodes and the work.

Other objects and advantages will hereinafter appear.

The accompanying drawing is illustrative of an embodiment of the invention.

Figure 1:
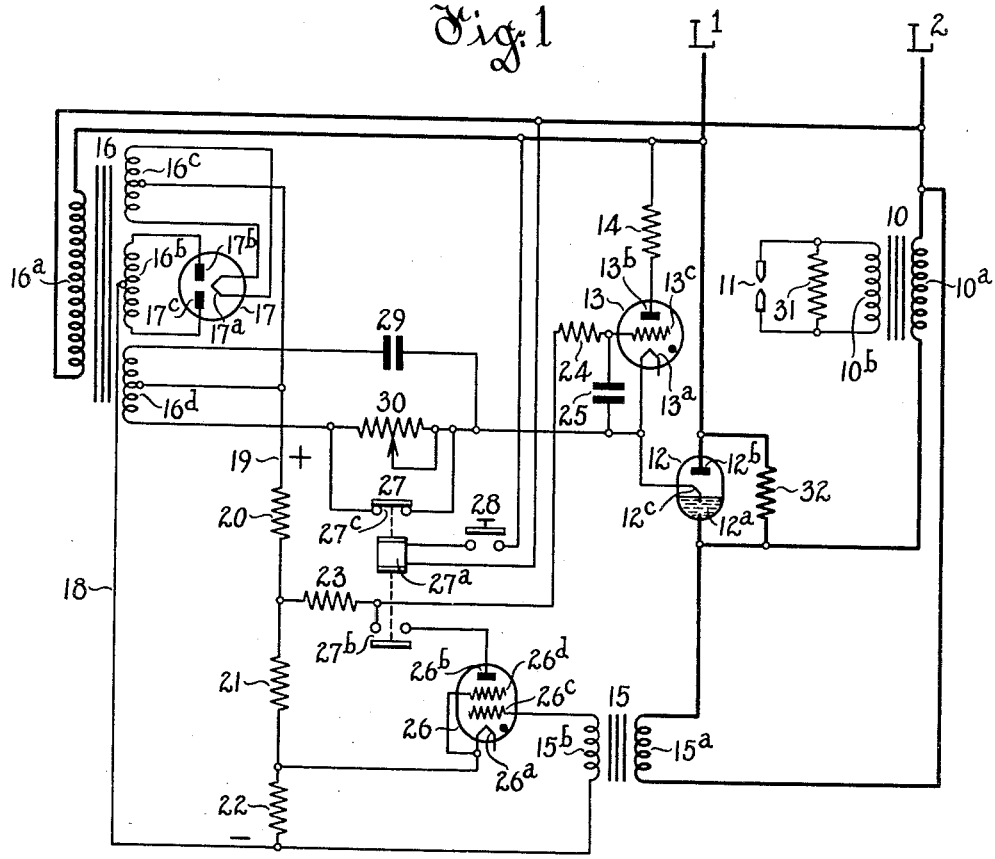

In the drawing, Figure 1 is a diagram of connections of a welding system, while

Figure 2:
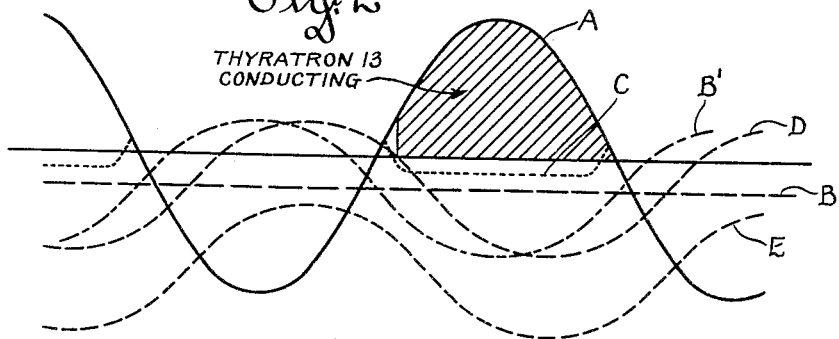

Fig. 2 is a diagram of the voltages and currents obtaining in the system under various conditions.

In the drawing, $L^1$ and $L^2$ are the bus bars of an alternating current supply circuit. The circuit supplies power to a welding transformer 10, having a primary winding $10^a$ and a secondary winding $10^b$. The secondary winding $10^b$ is connected to welding electrodes 11 which are operated in the usual manner to weld parts clamped therebetween. One terminal of the winding $10^a$ is connected to the bus bar $L^2$, while the second terminal is connected to the cathode $12^a$ of a gaseous tube or ignitron 12. The tube 12 has also an anode $12^b$ which is connected to the bus bar $L^1$ and an ignition electrode $12^c$. The ignition electrode $12^c$ is connected to the cathode $13^a$ of a gaseous electron tube or thyratron 13, which tube has an anode $13^b$ connected through a resistor 14 to the bus bar $L^1$, and additionally has a control electrode $13^c$.

Connected across the terminals of the primary winding $10^a$ of transformer 10 is the primary winding $15^a$ of an auxiliary transformer 15 which is provided with a secondary winding $15^b$.

The energy for operating the ignition circuit of the system is supplied by a transformer 16 which has a primary winding $16^a$ and three center tapped secondary windings $16^b$, $16^c$ and $16^d$. The secondary winding $16^b$ has its outside taps connected to the anodes $17^b$ and $17^c$ of a full wave rectifying tube 17, which has a filamentary cathode $17^a$. The center tap of the winding $16^b$ is connected to an auxiliary bus bar 18. The cathode $17^a$ is connected to the two outside terminals of the transformer winding $16^c$ to be supplied with heating energy therefrom, while the center tap of winding $16^c$ is connected to an auxiliary bus bar 19 which is positive with respect to bus bar 18. Connected between the bus bars 18 and 19 and in series with each other are three voltage dividing resistors 20, 21 and 22. A resistor 23 is connected in series with a resistor 24 between the common terminal of the resistors 20 and 21 and the grid $13^c$ of tube 13 to normally impress the potential of this common terminal upon the control electrode $13^c$. A smoothing condenser 25 may be connected between the control electrode $13^c$ and the cathode $13^a$. The voltage which is impressed upon the grid $13^c$ is controlled by a gaseous tube or thyratron 26 having a cathode $26^a$, and anode $26^b$, a control electrode $26^c$ and a shielding electrode $26^d$. The cathode $26^a$ is connected to the common terminal of the resistors 21 and 22. The control electrode $26^c$ is connected to one terminal of the transformer winding $15^b$, while the other terminal of said transformer winding is connected to the bus bar 18. The anode $26^b$ may be connected through a normally open contact $27^b$ of an electromagnetic switch 27 to the common terminal of resistors 23 and 24. The switch 27 has an energizing winding $27^a$ and a normally closed contact $27^c$. The winding $27^a$ is connected in series with a pushbutton or other type of normally open switch 28 across the lines $L^1$ and $L^2$.

To control the moment of ignition of the tube 13, which in turn controls the ignition of the tube 12, the system is provided with a phase shifting network comprising a condenser 29 which is connected in series with a variable resistor 30 across the outer terminals of the transformer winding $16^d$, while the center terminal $16^d$ of said winding is connected to the bus bar 19. The normally closed contacts $27^c$ are connected across the resistor 30 so as to short circuit the same when the switch 27 is deenergized.

The cathodes $13^a$ and $26^a$ may be heated in any conventional manner from any suitable source and as this forms no part of the invention provision for heating the same has been omitted from the drawing.

A resistor 31 of relatively high ohmic value is connected in shunt with the winding 10$^b$ of transformer 10 and a reactance or resistance 32 is connected in shunt with the tube 12.

The operation of the system is as follows: With the pushbutton switch 28 open, the electromagnetic switch 27 is deenergized. Therefore, the main discharge path of the tube 26 is interrupted and the tube is non-conducting. With the lines L$^1$ and L$^2$ energized no current can flow through the tube 12 unless a voltage of sufficient magnitude to initiate an ignition current is supplied to the ignition electrode 12$^c$ during some moment of the positive half cycle of the alternating voltage impressed upon said tube. This occurs if the tube 13 is rendered conducting during the same positive half cycle. The tube 13 is rendered conducting during the positive half cycle when the potential of the grid 13$^c$ is less negative than the critical grid voltage of said tube. It will be observed that normally the grid 13$^c$ has impressed thereon a negative unidirectional potential with respect to the cathode 13$^a$, substantially equal to the voltage drop through the resistor 20. This voltage is indicated by the horizontal line B in the diagram of Fig. 2, while the sinusoidal line A represents the voltage between the cathode and the anode when the tube is non-conducting. It will be observed that the voltage B is more negative than the critical ignition voltage indicated by the curve C.

There is also impressed upon said grid 13$^c$ an alternating potential from the winding 16$^d$, which winding is so connected that said potential leads by 180 degrees the voltage between the main electrodes. This latter potential is superposed upon the voltage B resulting in the voltage B'. It will be noted that during the positive half cycle of the anode voltage the resultant voltage of the grid 13$^c$ is never less negative than the critical voltage C and therefore the tubes 13 and 12 remain non-conducting. If now the pushbutton switch 28 is depressed, the relay 27 is energized, thereby opening the contacts 27$^c$ and closing the contacts 27$^b$. Opening the contacts 27$^c$ inserts a variable part of the resistor 30 into the condenser-resistor network comprising the condenser 29 and resistor 30, which causes in a well known manner a retardation of the potential of the grid 13$^c$ with respect to the cathode 13$^a$, so that the grid voltage is shifted as shown by the curve D. It will be observed that now the grid voltage intersects the curve C for the critical voltage near the beginning of the positive half cycle of the cathode voltage A so that the tube 13 becomes conducting during the major part of the positive half cycle. As the tube 13 becomes conducting it passes ignition current from line L$^1$, through the tube 13 to the ignition electrode 12$^c$, the cathode 12$^a$, through the transformer winding 10$^a$ to line L$^2$. This ignition current causes the breakdown of the tube 12 and the latter becomes conducting, thereby passing current from line L$^1$ through the tube 12, through the primary winding 10$^a$ of the transformer 10 to line L$^2$. This in turn induces a current in the secondary winding 10$^b$ which passes between the welding electrodes 11 and the latter perform the welding work.

The resistor 30 of the phase shaft network is preferably adjusted so that the voltage curve D intersects the ignition voltage curve C substantially at the beginning of the positive half cycle of the voltage A between the main electrodes, so as to insure the flow of welding current during substantially the entire positive half cycle.

The closure of the contacts 27$^b$ completes the circuit for the main electrodes of the tube 26 so that a continuous voltage is impressed thereon which is equal to the voltage drop through the resistor 21. The flow of current through the tube 12 also energizes the primary winding 15$^a$ of the transformer 15, which induces a voltage in the secondary winding 15$^b$ to impress upon the control electrode 26$^c$ a voltage which renders the tube 26 conducting. The flow of current through the tube 26 continues as long as the contacts 27$^b$ are closed and produces a voltage drop in the resistor 23 which depresses the voltage of the grid 13$^c$ as indicated by the curve E to prevent restarting of conduction of the tube 13 during the next succeeding positive half cycle. The tube 13 thus prevents re-ignition of the tube 12 and only a single impulse of current is sent through the transformer winding 10$^a$ regardless of how long the pushbutton switch 28 remains closed.

In order to provide for another impulse of current through the welding transformer it is necessary to release the pushbutton 28 thereby reclosing the contacts 27$^c$ and opening the contacts 27$^b$. Opening of the contacts 27$^b$ interrupts the current flowing through the tube 26, so that the potential of the ignition electrode 13$^c$ returns again from that shown by curve E to that shown by curve B' whereupon the equipment is ready for another impulse.

It should be pointed out that the current which normally flows through the resistor 32 in shunt with the tube 12 is too small in view of the bias provided by the potential drop across resistor 22 to induce a voltage in the transformer windings 14$^a$ and 15$^b$ sufficient to render the tube 26 conducting. However, the current which flows through resistor 32, winding 10$^a$ to line L$^2$ provides an alternating demagnetizing flux in said winding to reduce the residual magnetism in transformer 10 due to the high magnetization from a previous operation.

This demagnetizing current in turn induces a voltage in the secondary winding 10$^b$ which is of low value. To avoid any flashing at the welding electrodes 11 as they come in contact with or leave the work, the secondary current is bypassed through the resistor 31.

We claim:

1. The combination of an alternating current supply, a welding transformer having a primary and a secondary winding, an ignitron in circuit with said supply and said primary winding, a first and a second thyratron, said first thyratron having its main discharge path connected in circuit with said supply and the ignition electrode of said ignitron to control supply of ignition current to the latter, means to normally impress upon the control electrode of said first thyratron a voltage varying in synchronism with the voltage of said supply which blocks current conduction by said thyratron, manually actuated means operable to modify the voltage impressed upon said control electrode of said first thyratron to render it conducting during a positive half cycle of the supply voltage and to impress a unidirectional voltage upon the main discharge path of said second thyratron, and means responsive to the flow of current in said ignitron to initiate current flow in said second thyratron for neutralizing the effect of said manually actuated means upon said first thyratron pending release and re-actuation of said manually actuated means.

2. The combination of an alternating current supply, a welding transformer having a primary and a secondary winding, an ignitron in circuit with said supply and said primary winding, a first and a second thyratron, said first thyratron having its main discharge path connected in circuit with said supply and the ignition electrode of said ignitron to control supply of ignition current to the latter, means to normally impress upon the control electrode of said first thyratron a voltage varying in synchronism with the voltage of said supply which blocks current conduction by said thyratron, manually actuated means operable to modify the voltage impressed upon said control electrode of said first thyratron to render it conducting during a positive half cycle of the supply voltage and to impress a unidirectional voltage upon the main discharge path of said second thyratron, means responsive to the flow of current in said ignitron to initiate current flow in said second thyratron, and means responsive to current flow in said second thyratron to neutralize the effect of said manually actuated means upon said first thyratron, pending release and re-actuation of said manually actuated means.

3. The combination with an alternating current welding transformer having a primary and a secondary winding and a unidirectionally conducting device controllable to supply a half wave of rectified current to said primary winding, of a relatively high impedance connected in parallel with said device to afford passage of an alternating demagnetizing current of relatively low magnitude through said primary winding while said device is non-conducting.

4. The combination with an alternating current welding transformer having a primary and a secondary winding and a unidirectionally conducting device controllable to supply a half wave of rectified current to said primary winding, of an impedance connected in parallel with said device, said impedance being proportioned to permit the passage of current through said primary winding to afford demagnetization of said transformer following the passage of welding current through said device, but to limit the magnitude of said demagnetizing current to a value below that which effects welding action.

5. In an alternating current welding system, the combination with an alternating current transformer having a primary and a secondary winding, a pair of welding electrodes connected to the latter and a unidirectional conducting device in series with said primary winding and controllable to supply half wave rectified current to said primary winding, of means to supply an alternating demagnetizing current of relatively low magnitude to said primary winding while said device is non-conducting, and a high resistance connected in parallel with said electrodes to afford a discharge path for the current induced in said secondary winding by said demagnetizing current.

6. The combination of an alternating current supply, a welding transformer having a primary and a secondary winding, an ignitron in circuit with said supply and said primary winding, a relatively high impedance in parallel with said ignitron to afford passage through said winding of an alternating current of relatively low magnitude while said ignitron is non-conducting, a first and a second thyratron, said first thyratron having its main discharge path connected in circuit with said supply and the ignition electrode of said ignitron to control supply of ignition current to the latter, means to normally impress upon a control electrode of said first thyratron a voltage varying in synchronism with the voltage of said supply which blocks current conduction by said thyratron, manually actuated means operable to modify the voltage impressed upon said control electrode of said first thyratron to render it conducting during a positive half cycle of the supply voltage and to impress a unidirectional voltage upon the main discharge path of said second thyratron, and means responsive to the flow of current in said ignitron to initiate current flow in said second thyratron for neutralizing the effect of said manually actuated means upon said first thyratron pending release and reactuation of said manually actuated means.

7. The combination of an alternating current supply, a welding transformer having a primary and a secondary winding, an ignitron in circuit with said supply and said primary winding, an impedance in parallel with said ignitron which impedance following passage of welding current through said ignitron permits passage of current through said primary winding for demagnetizing the same and limits the demagnetizing current to a value below that required for welding, a first and a second thyratron, said first thyratron having its main discharge path connected in circuit with said supply and the ignition electrode of said ignitron to control supply of ignition current to the latter, means to normally impress upon the control electrode of said first thyratron a voltage varying in synchronism with the voltage of said supply which blocks current conduction by said thyratron, manually actuated means operable to modify the voltage impressed upon said control electrode of said first thyratron to render it conducting during a positive half cycle of the supply voltage and to impress a unidirectional voltage upon the main discharge path of said second thyratron, means responsive to the flow of current in said ignitron to initiate current flow in said second thyratron, and means responsive to current flow in said second thyratron to neutralize the effect of said manually actuated means upon said first thyratron, pending release and reactuation of said manually actuated means.

IRVIN W. COX.
JEROME B. WELCH.

REFERENCES CITED

The following references are of record in the file of this patent:

UNITED STATES PATENTS

| Number | Name | Date |
|---|---|---|
| 1,904,485 | Livingston | Apr. 18, 1933 |
| 1,928,812 | Dawson | Oct. 3, 1933 |
| 2,024,173 | Langmuir | Dec. 17, 1935 |
| 2,066,943 | Philpott | Jan. 5, 1937 |
| 2,089,213 | Labadie | Aug. 10, 1937 |
| 2,120,565 | Lord et al. | June 14, 1938 |
| 2,255,652 | Dawson et al. | Sept. 9, 1941 |
| 2,294,388 | Dawson | Sept. 1, 1942 |
| 2,295,293 | Rogers | Sept. 8, 1942 |
| 2,340,131 | Lord | Jan. 25, 1944 |
| 2,355,633 | Dawson | Aug. 15, 1944 |
| 2,356,765 | Klemperer | Aug. 29, 1944 |
| 2,362,769 | Paratt et al. | Nov. 14, 1944 |
| 2,439,938 | Lee et al. | Apr. 20, 1948 |

FOREIGN PATENTS

| Number | Country | Date |
|---|---|---|
| 420,100 | Great Britain | Nov. 26, 1934 |
| 423,166 | Great Britain | Jan. 16, 1935 |